United States Patent
Wu et al.

(10) Patent No.: US 7,974,367 B1
(45) Date of Patent: *Jul. 5, 2011

(54) SYMBOL TIMING METHOD AND DIGITAL RECEIVER APPARATUS

(75) Inventors: Songping Wu, Sunnyvale, CA (US); Hui-Ling Lou, Palo Alto, CA (US)

(73) Assignee: Marvell International Ltd., Hamilton (BM)

( * ) Notice: Subject to any disclaimer, the term of this patent is extended or adjusted under 35 U.S.C. 154(b) by 0 days.

This patent is subject to a terminal disclaimer.

(21) Appl. No.: 12/724,250

(22) Filed: Mar. 15, 2010

Related U.S. Application Data

(63) Continuation of application No. 11/510,310, filed on Aug. 25, 2006, now Pat. No. 7,702,041.

(60) Provisional application No. 60/761,111, filed on Jan. 23, 2006.

(51) Int. Cl.
*H04L 27/00* (2006.01)

(52) U.S. Cl. ...................................... 375/326

(58) Field of Classification Search .................. 375/316, 375/326, 327, 329; 329/304, 306, 307
See application file for complete search history.

(56) References Cited

U.S. PATENT DOCUMENTS

| | | | |
|---|---|---|---|
| 5,566,214 A | 10/1996 | Kroeger et al. | |
| 6,127,884 A | 10/2000 | Rishi | |
| 6,266,365 B1 * | 7/2001 | Wang et al. | 375/150 |
| 6,882,208 B1 | 4/2005 | Suissa et al. | |
| 6,990,160 B1 | 1/2006 | Abe et al. | |
| 7,492,836 B2 | 2/2009 | Mizukami | |
| 2005/0163274 A1 | 7/2005 | Ito | |
| 2005/0164639 A1 | 7/2005 | Suissa et al. | |

OTHER PUBLICATIONS

"Bluetooth Measurement Fundamental," Agilient Technologies, Inc., pp. 1-40, 5988-3760EN (Oct. 2005).

* cited by examiner

*Primary Examiner* — Don N Vo

(57) ABSTRACT

The present invention provides for receiving a radio frequency signal which encodes transmitted data, and for outputting data corresponding to the transmitted data. The radio frequency signal is received and converted to inphase and quadrature data. Phase information is extracted from the inphase and quadrature data. A symbol timing for the radio signal is determined based on the extracted phase information. The transmitted data encoded within the radio frequency signal is detected and processed based on the determined symbol timing. Data is output based on the detected and processed transmitted data. Since symbol timing is determined based on phase information, in the phase domain, a radio frequency receiver can be constructed with a lower complexity and a simpler structure.

20 Claims, 6 Drawing Sheets

SYMBOL TIMING METHOD AND DIGITAL RECEIVER APPARATUS

CROSS-REFERENCE TO RELATED APPLICATION

The present application is a continuation of U.S. patent application Ser. No. 11/510,310, entitled "SYMBOL TIMING METHOD AND DIGITAL RECEIVER APPARATUS," filed on Aug. 25, 2006, which claims priority to U.S. Provisional Patent Application No. 60/761,111, entitled "A LOW-COMPLEXITY SYMBOL TIMING METHOD." The specifications of said applications are hereby incorporated by reference in their entirety for all purposes except for those sections, if any, that are inconsistent with the present specification.

BACKGROUND OF THE INVENTION

1. Field of the Invention

The invention relates to the field of radio frequency receivers utilized within wireless communication systems, and more particularly to synchronization of symbol timing for such radio frequency receivers.

2. Description of the Related Art

Wireless communication systems typically utilize a radio frequency transmitter for wirelessly transmitting data, and a radio frequency receiver for receiving the transmitted data. However, the radio frequency transmitter and the radio frequency receiver typically operate under the control of different clocks. As such, although the clocks of the two devices are designed to operate under the same frequency, there is a likelihood of a clock rate difference between the radio frequency transmitter and the radio frequency receiver. This clock rate difference can cause the receiver to see incoming data at a rate which is different than that expected, thus leading to improper acknowledgment and processing of the data.

As such, the radio frequency receiver cannot start randomly at any time. Rather, the radio frequency receiver needs to know a certain time index to detect the transmitted data. This timing index can be provided by using a symbol timing.

In conventional approaches, synchronization of symbol timing typically relies on signal correlations within a received signal. Such conventional approaches typically calculate a symbol timing as follows:

$$C_n = \sum_{i=0}^{N-1} y(n-i)y*(n-i-L) \quad \text{(Equation 1)}$$

where Cn represents a symbol timing candidate, y(n) represents the received signal, L represents the symbol duration between two neighboring identical symbols, and N denotes the correlation block size. The received signal y(n) is a complex value having real and imaginary (quadrature) components, and y*(n) is the complex conjugate. Symbol timing $\hat{n}$ can be found at the position where Cn reaches its peak value, substantially as follows:

$$\hat{n} = \max_n(|C_n|) \quad \text{(Equation 2)}$$

Although the conventional approaches are capable of symbol timing synchronization, they are not without problems. For example, since the above equations are seen to include complex multiplications and additions, implementation costs, surface requirements and power consumption can be high. Accordingly, a symbol timing method with lower complexity and simpler structure, but comparable performance, is desired.

SUMMARY OF THE INVENTION

According to one aspect of the invention, symbol timing is performed in the phase domain. Thus, to extract data encoded by a transmitted radio frequency signal, the radio frequency signal is received and converted to inphase and quadrature data. Phase information is extracted from the inphase and quadrature data. A symbol timing for the radio frequency signal is determined based on the extracted phase information. The data encoded by the radio frequency signal is detected and processed based on the determined symbol timing. Data is output based on the detected and processed data.

Because symbol timing is performed in the phase domain, real addition can be used instead of the complex multiplication and addition for conventional approaches. Thus, a radio frequency receiver can be constructed with a lower complexity and a simpler structure.

In more specific aspects of the invention, the processing of the transmitted data encoded within the frequency signal can include demodulating, decoding and slicing the transmitted data. The transmitted data can be encoded within the radio frequency signal using phase-key shifting (PSK).

The symbol timing can be determined by selecting one of a plurality of symbol timing candidates, the plurality of symbol timing candidates being based on phase differences within the extracted phase information.

Each of the plurality of symbol timing candidates can be calculated substantially as follows:

$$c_n = \sum_{i=n-N+1}^{n} \text{angle}[y(i)y*(i-L)] = \sum_{i=n-N+1}^{n}(a_i - a_{i-L}) = \sum_{i=n-N+1}^{n} d_i$$

wherein $c_n$ represents the symbol timing candidate, y(n) represents the radio frequency signal, y*(n) represents the complex conjugate of y(n), $a_n$ represents a phase of y(n), L represents a symbol duration between two neighboring symbols of the radio frequency signal, N represents a correlation block size associated with the radio frequency signal, and $d_n$ represents the difference between $a_n$ and $a_{n-L}$.

The phase differences can correspond to at least a frequency offset of the radio frequency signal, and the determined symbol timing can account for the frequency offset. Each of the plurality of symbol timing candidates can be calculated substantially as follows:

$$c_n = \sum_{i=n-N+1}^{n} d_i - Nd_{n-N+1}$$

wherein $c_n$ represents the symbol timing candidate, N represents a correlation block size associated with the radio frequency signal, $d_n$ represents the difference in phases between neighboring symbols of the radio frequency signal, and the term $Nd_{n-N+1}$ corresponds to the frequency offset.

Each of the plurality of symbol timing candidates can be calculated substantially as follows:

$$c_n = c_{n-1} + (d_n - d_{n-N}) + N(d_{n-N} - d_{n-N+1})$$

wherein $c_n$ represents the symbol timing candidate, N represents a correlation block size associated with the radio frequency signal, and $d_n$ represents the difference in phases between neighboring symbols of the radio frequency signal.

In an alternative embodiment, a pilot value can be used in determining symbol timing candidates. Although phase information is still relied on, this embodiment works with a pilot value instead of intra-signal cross correlation. More particularly, each of the plurality of symbol timing candidates can be calculated substantially as follows:

$$c_n = \sum_{i=0}^{N-1} \text{angle}[y(n-i)p*(i)] = \sum_{i=0}^{N-1} (a_{n-i} - b_i) = \sum_{i=n-N+1}^{n} d_i$$

wherein $c_n$ represents the symbol timing candidate, y(n) represents the radio frequency signal, $a_n$ represents a phase of y(n), p(n) indicates a pilot value which is known, $b_n$ indicates the phase of p(n), N represents a correlation block size associated with the radio frequency signal, and $d_n$ represents the difference in phases between neighboring symbols of the radio frequency signal.

The determined symbol timing can be selected from the plurality of symbol timing candidates, $c_n$, using substantially the following formula:

$$\hat{n} = \min_n(|C_n|)$$

wherein $\hat{n}$ represents the determined symbol timing.

The plurality of symbol timing candidates can correspond to symbol timing candidates calculated within the duration of a timer, the timer starting once a symbol timing candidate exceeds a first threshold. The timer can stop once a symbol timing candidate falls below a second threshold. The timer can also stop once a symbol timing candidate falls below a second threshold for a predetermined duration.

This brief summary has been provided so that the nature of the invention may be understood quickly. A more complete understanding of the invention can be obtained by reference to the following detailed description of the preferred embodiment thereof in connection with the attached drawings.

DETAILED DESCRIPTION OF THE INVENTION

Figure 1:
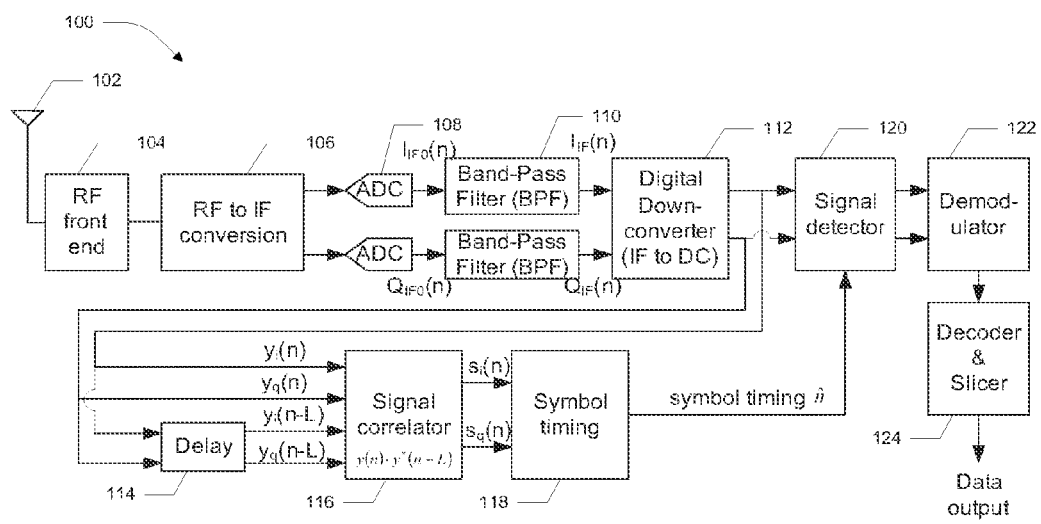
FIG. 1 is a block diagram illustrating a radio frequency receiver in accordance with a representative embodiment of the present invention.

Referring to FIG. 1, a block diagram illustrating a radio frequency receiver in accordance with a representative embodiment of the present invention is shown. Radio frequency receiver 100 includes an antenna 102 connected to an RF (radio frequency) front end 104 for receiving a radio frequency signal, which encodes transmitted data. The RF front end 104 connects to an input of an RF-to-IF (intermediate frequency) conversion unit 106, which converts the radio frequency signal to an intermediate frequency signal. The intermediate frequency signal is used as input for two ADCs (analog-to-digital converters) 108. This results in an inphase component $I_{IFO}(n)$ and a quadraphase component $Q_{IFO}(n)$, where n represents absolute time for the radio frequency signal.

Components $I_{IFO}(n)$ and $Q_{IFO}(n)$ are provided as input to BPF (band-pass filters) 110, resulting in filtered components $I_{IF}(n)$ and $Q_{IF}(n)$. The filtered components are provided to an input of a digital down-converter (IF to DC) 112, which converts from intermediate frequency to low frequency direct current, thus yielding $y_i(n)$ and $y_q(n)$ components. Each of these components are split, so that part of $y_i(n)$ and part of $y_q(n)$ is provided as input to a delay unit 114. Accordingly, a signal correlator 116 receives as input components $y_i(n)$ and $y_q(n)$, as well as delayed components $y_i(n-L)$ and $y_q(n-L)$.

In this regard, y(n) in signal correlator 116 is a complex signal given by $y(n) = y_i(n) + j y_q(n)$. Signal correlator 116 performs the function of $y(n) \cdot y^*(n-L)$, and outputs $s_i(n)$ and $s_q(n)$ components. These components are in turn provided as input to a symbol timing unit 118, which is described in more detail below with respect to FIG. 2.

Symbol timing unit 118 outputs an estimated symbol timing $\hat{n}$, which is provided as input to a signal detector 120. The signal detector also receives as input the $y_i(n)$ and $y_q(n)$ components outputted by the digital down-converter 112. The signal detector 120 uses the symbol timing $\hat{n}$ as a timing estimate for detecting the transmitted data encoded within the radio frequency signal. The detected signal is provided as input to a demodulator 122, and to a decoder and slicer unit 124. After being demodulated, decoded and sliced, data corresponding to the original data encoded by the transmitted RF signal can be output.

Figure 2:
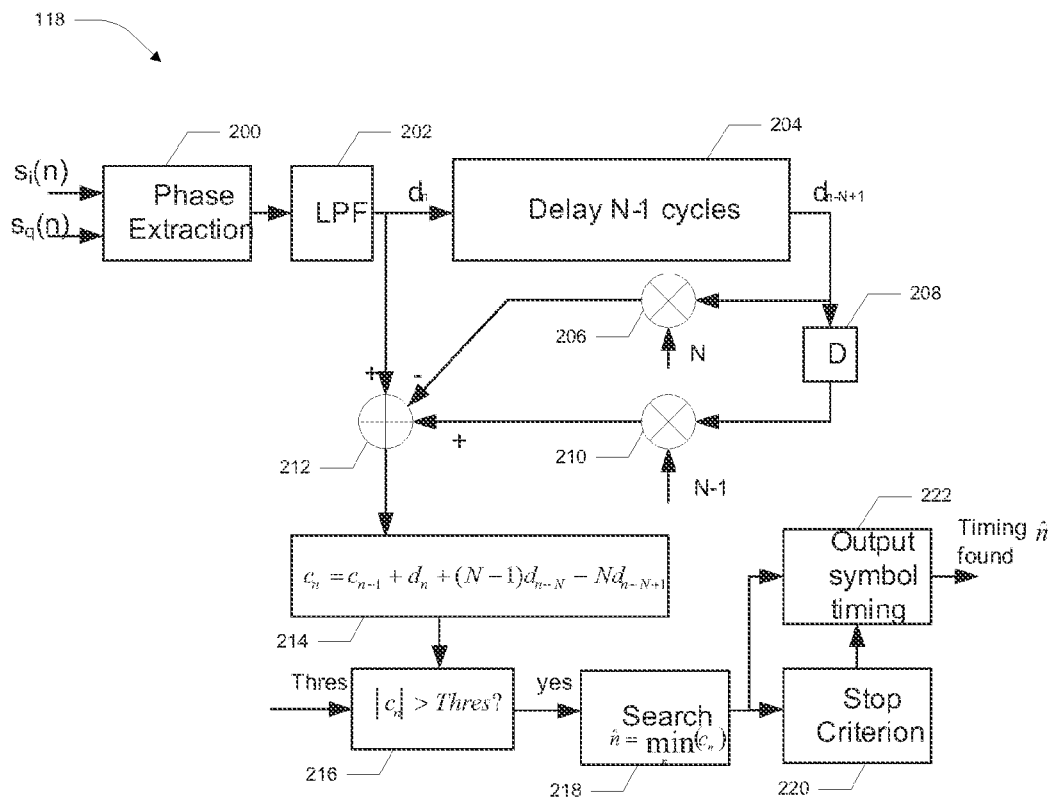
FIG. 2 is a block diagram that illustrates a symbol timing unit in accordance with a representative embodiment of the invention.

Referring now to FIG. 2, a block diagram that illustrates a symbol timing unit in accordance with a representative embodiment of the invention is shown. As noted above, the symbol timing unit 118 of FIG. 1 receives as input $s_i(n)$ and $s_q(n)$ components, which respectively correspond to inphase and quadraphase components of a radio frequency signal encoded with the transmitted data. The symbol timing unit 118 outputs a symbol timing $\hat{n}$, which is used as a timing estimate for detecting and processing the transmitted data.

In this regard, conventional approaches for determining symbol timing typically rely on signal correlations within a received signal, as shown in Equations (1) and (2). The symbol timing method presented by Equations (1) and (2) actually implies that the maximum correlation output (absolute value) can be reached if every single correlation term in Equation (1) has the same or similar phase because of the strong correlation between time delayed signals, and if the summation of all these values will be constructive.

In light of this observation, the present invention uses phase information itself. In one representative embodiment, Equation (1) can be transformed substantially into the following:

$$c_n = \sum_{i=n-N+1}^{n} \text{angle}[y(i)y*(i-L)] = \sum_{i=n-N+1}^{n} (a_i - a_{i-L}) = \sum_{i=n-N+1}^{n} d_i \qquad \text{(Equation 3)}$$

In Equation (3), $c_n$ represents the symbol timing candidate, y(n) represents the radio frequency signal, y*(n) represents the complex conjugate of y(n), $a_n$ represents a phase of y(n), L represents a symbol duration between two neighboring symbols of the radio frequency signal, N represents a correlation block size associated with the radio frequency signal, and $d_n$ represents the difference between $a_n$ and $a_{n-L}$.

Based on the values calculated by Equation (3), a symbol timing n̂ can be found by determining a minimum value of all symbol timing candidates, $c_n$, substantially as follows:

$$\hat{n} = \min_n(|C_n|) \qquad \text{(Equation 4)}$$

It should be noted that in Equation (3), cross correlation is used. However, in a pilot-assisted system where a pilot value is known, Equation (3) can also be rewritten substantially as follows:

$$c_n = \sum_{i=0}^{N-1} \text{angle}[y(n-i)p*(i)] = \sum_{i=0}^{N-1} (a_{n-i} - b_i) = \sum_{i=n-N+1}^{n} d_i \qquad \text{(Equation 5)}$$

In Equation (5), p(n) indicates the pilot with the known value and b(n) indicates the phase of p(n). The search for the symbol timing n̂ remains the same, using Equation (4).

It should be noted that the symbol timing calculations of Equations (3) and (4) may be sensitive to frequency offset. To address this issue, Equation (3) can be modified in one embodiment substantially as follows:

$$c_n = \sum_{i=n-N+1}^{n} d_i - N d_{n-N+1} \qquad \text{(Equation 6)}$$

In this regard, Equation (6) is seen to modify Equation (3) by adding robustness against frequency offset. More particularly, Equation (6) is seen to focus on the phase differences of all N−1 terms from the very first term, and therefore virtually any existing frequency or phase offset will appear in these phase differences. As such, the minimum of Equation (4) is seen to be achieved at the point where every single correlation steers at the same direction.

Further, to reduce the implementation cost, Equation (6) can be re-written in iterative form substantially as follows:

$$c_n = c_{n-1} + (d_n - d_{n-N}) + N(d_{n-N} - d_{n-N+1}) \qquad \text{(Equation 7)}$$

Comparing Equation (7) to the conventional approach of Equation (1), it can be seen that N complex multiplications and N−1 complex additions per clock cycle have been reduced. Equation (7) can also seen to correspond with an accumulator structure, which can be used to compute the cost function. Thus, by using phase information instead of correlation information itself, and when taking the precision of data into consideration, the savings on power and area is seen to be significantly improved.

In this regard, the pilot-assisted method of Equation (5) can also be sensitive to frequency offset. As such, frequency offset estimation and compensation can be performed separately before the symbol timing is determined.

In implementing the above equations which use phase information, the symbol timing unit 118 of FIG. 2 includes a phase extraction unit 200 for extracting phase information from the $s_i(n)$ and $s_q(n)$ components of the radio frequency signal. A phase $a_n$ is provided as input to a LPF (low-pass filter) 202, since an incoming signal may be noisy under low SNRs (signal-to-noise ratios).

The low-pass filtered $a_n$ is provided to a delay unit 204, which delays N−1 cycles for $a_n$, thus outputting $a_{n-N+1}$. The $a_{n-N+1}$ signal is provided to an N-multiplier 206 and to a delay unit 208. The signal from the delay unit 208 is in turn provided to an (N−1)-multiplier 210. The output of the N-multiplier 206 and the (N−1)-multiplier 210 is provided as input to an adder 212, which also receives input from the LPF 202. The output 214 of adder 212 is substantially as follows:

$$c_n = c_{n-1} + d_n + (N-1)d_{n-N} - N d_{n-N1} \qquad \text{(Equation 8)}$$

Equation (8) is seen to generally correspond with Equation (7). Thus, the embodiment of FIG. 2 is seen to provide savings on power/area when compared with conventional approaches.

In determining the symbol timing n̂ from the symbol timing candidates $c_n$, a timer can be used for the validation of the search period. In this regard, once $c_n$ reaches a particular threshold, as determined by calculation unit 216, a timer will start. The search for n̂, which corresponds to the minimum value of $c_n$, will continue until the timer expires. This minimum value is assessed by calculation unit 218. The search continues until a stop criterion is reached, as determined by stop criterion unit 220. The advantage of this approach is seen to be simple, straightforward and easy to control. It is seen to be especially useful with an AWGN channel or a strong line-of-sight channel.

The stop criterion can be determined using at least two approaches. In one approach, the absolute value of $c_n$ is used to stop the search of symbol timing. In other words, whenever $c_n$ drops back below a certain threshold, searching is stopped. This approach is seen to react quickly, but can be susceptible to false alarms in case of heavy noise. As such, this approach is seen to be more suitable for systems with a smaller range of SNR (e.g., systems with one or two modulation types).

In another approach for stop criterion, the falling edge of $c_n$ can be used to stop the search of symbol timing. In other words, whenever $c_n$ drops back below a certain threshold for a certain duration, searching is stopped. Compared with the first approach, this approach is seen to be more reliable but slower. As such, this approach is seen to be more useful when the working SNR range is relatively large.

Once a minimum value has been determined, the symbol timing n̂ is output by an output symbol timing unit 222. As noted above with reference to FIG. 1, the output symbol timing n̂ is provided as input to the signal detector 120.

Accordingly, the radio frequency receiver of FIGS. 1 and 2 can be used in a generic communications system, and is seen to provide similar performance when compared with the conventional approaches. For example, the proposed approach is very suitable for a differential receiver.

In addition, the radio frequency receiver of FIGS. 1 and 2 is seen to provide several advantages. Since the approach for determining symbol timing is done in the phase domain, it ordinarily uses only real addition, instead of the complex multiplication and additions for conventional approaches. In addition, robustness to frequency offset can be sustained by looking at the phase differences between received phases. Furthermore, an accumulator structure can be used to compute the cost function, as shown in Equations (7) and (8). Thus, the implementation cost, area and power consumption is seen to remain the same regardless of the correlation length N. In addition, the criterion to start and stop searching is seen to be flexible, depending on the application used.

Figure 3:
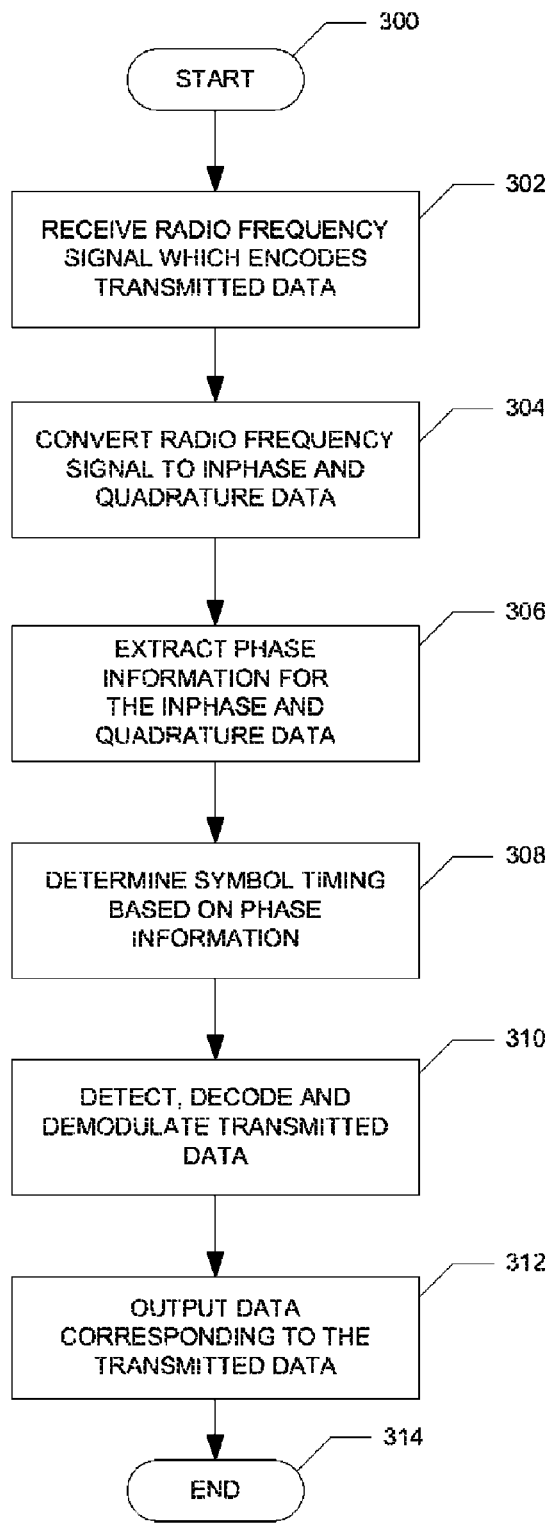
FIG. 3 is a flowchart depicting the receiving of a radio frequency signal by a radio frequency receiver and the outputting of data encoded by the radio frequency signal, in accordance with a representative embodiment of the invention.

Referring now to FIG. 3, a flowchart depicting the receiving and outputting of a radio frequency signal by a radio frequency receiver, in accordance with a representative embodiment of the invention is shown. Following start bubble 300, a radio frequency signal is received, where the radio signal encodes transmitted data (block 302). The radio frequency signal is converted to inphase and quadraphase data (block 304), and phase information is extracted for the inphase and quadraphase data (block 306).

A symbol timing is then determined based on the extracted phase information (block 308). In this regard, the symbol timing can be determined in the manner described above with reference to FIG. 2. The transmitted data encoded within the radio frequency signal is then detected and processed, where the processing can involve decoding, demodulating and slicing of the transmitted data (block 310). Finally, data is output corresponding to the transmitted data (block 312), and the process exits (end bubble 314).

The embodiments described above for determining symbol timing are seen be to effective in generic communication systems, and are particularly suited for systems with constant-amplitude transmissions, such as DPSK (differential phase-shift keying) systems.

FIGS. 4 through 8 show additional embodiments of the invention when implemented as part of a wireless LAN (WLAN) in particular applications of WLAN.

Figure 4:
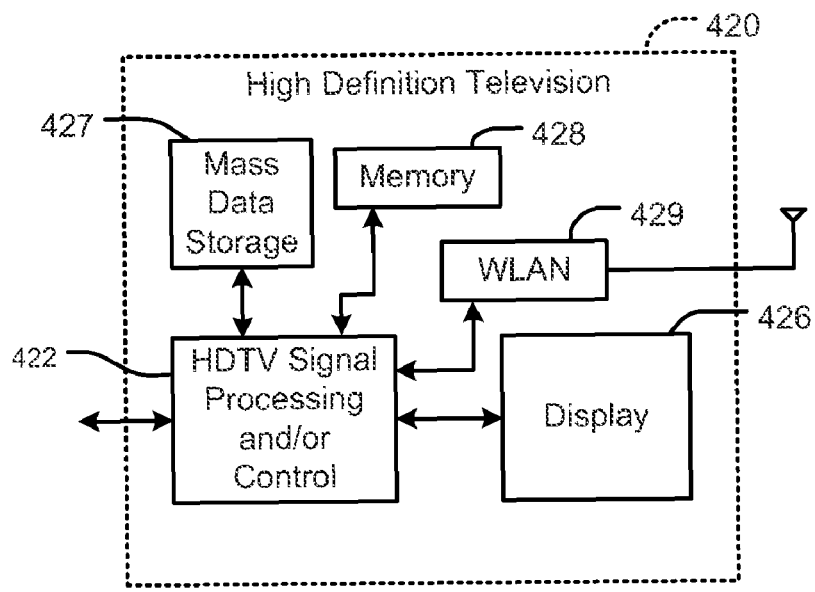
FIG. 4 illustrates an additional embodiment of the invention, embodied in a high definition television (HDTV).

Referring now to FIG. 4, the present invention may be embodied in a high definition television (HDTV) 420. The present invention may implement either or both signal processing and/or control circuits, which are generally identified in FIG. 4 at 422, a WLAN interface and/or mass data storage of the HDTV 420. HDTV 420 receives HDTV input signals in either a wired or wireless format and generates HDTV output signals for a display 426. In some implementations, signal processing circuit and/or control circuit 422 and/or other circuits (not shown) of HDTV 420 may process data, perform coding and/or encryption, perform calculations, format data and/or perform any other type of HDTV processing that may be required.

HDTV 420 may communicate with mass data storage 427 that stores data in a nonvolatile manner such as optical and/or magnetic storage devices. The HDD may be a mini HDD that includes one or more platters having a diameter that is smaller than approximately 1.8". HDTV 420 may be connected to memory 428 such as RAM, ROM, low latency nonvolatile memory such as flash memory and/or other suitable electronic data storage. HDTV 420 also may support connections with a WLAN via a WLAN network interface 429.

Figure 5:
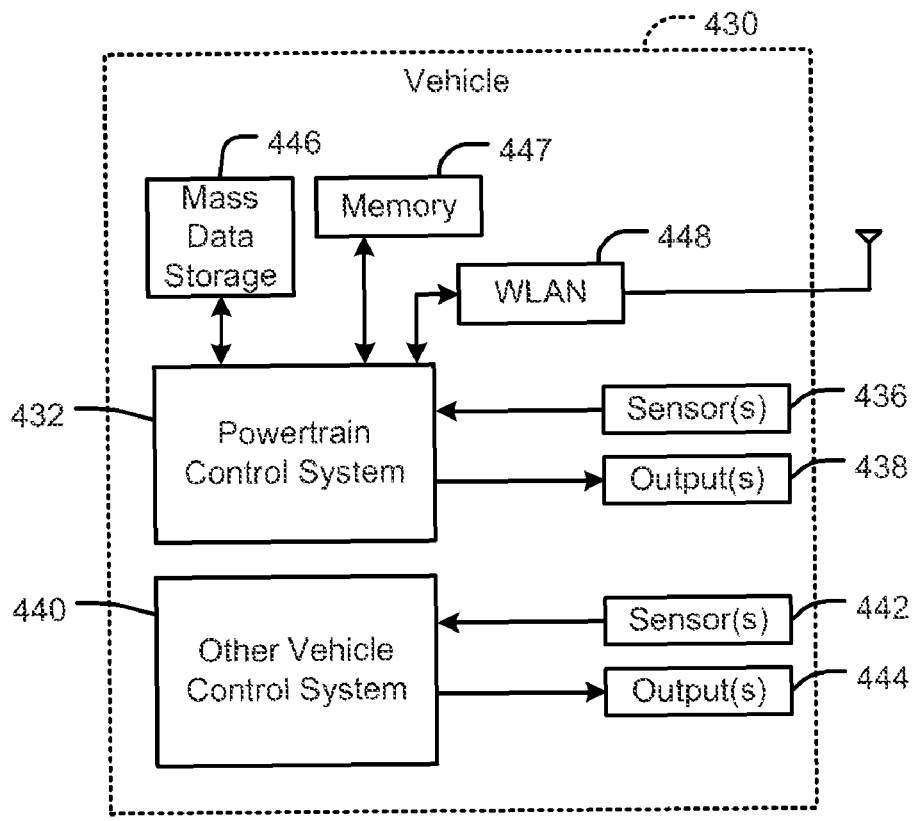
FIG. 5 illustrates an additional embodiment of the invention, implementing a control system of a vehicle, a WLAN interface and/or mass data storage of the vehicle control system.

Referring now to FIG. 5, the present invention implements a control system of a vehicle 430, a WLAN interface and/or mass data storage of the vehicle control system. In some implementations, the present invention implements a powertrain control system 432 that receives inputs from one or more sensors such as temperature sensors, pressure sensors, rotational sensors, airflow sensors and/or any other suitable sensors and/or that generates one or more output control signals such as engine operating parameters, transmission operating parameters, and/or other control signals.

The present invention may also be embodied in other control systems 440 of vehicle 430. Control system 440 may likewise receive signals from input sensors 442 and/or output control signals to one or more output devices 444. In some implementations, control system 440 may be part of an anti-lock braking system (ABS), a navigation system, a telematics system, a vehicle telematics system, a lane departure system, an adaptive cruise control system, a vehicle entertainment system such as a stereo, DVD, compact disc and the like. Still other implementations are contemplated.

Powertrain control system 432 may communicate with mass data storage 446 that stores data in a nonvolatile manner. Mass data storage 446 may include optical and/or magnetic storage devices for example hard disk drives HDD and/or DVDs. The HDD may be a mini HDD that includes one or more platters having a diameter that is smaller than approximately 1.8". Powertrain control system 432 may be connected to memory 447 such as RAM, ROM, low latency nonvolatile memory such as flash memory and/or other suitable electronic data storage. Powertrain control system 432 also may support connections with a WLAN via a WLAN network interface 448. The control system 440 may also include mass data storage, memory and/or a WLAN interface (all not shown).

Figure 6:
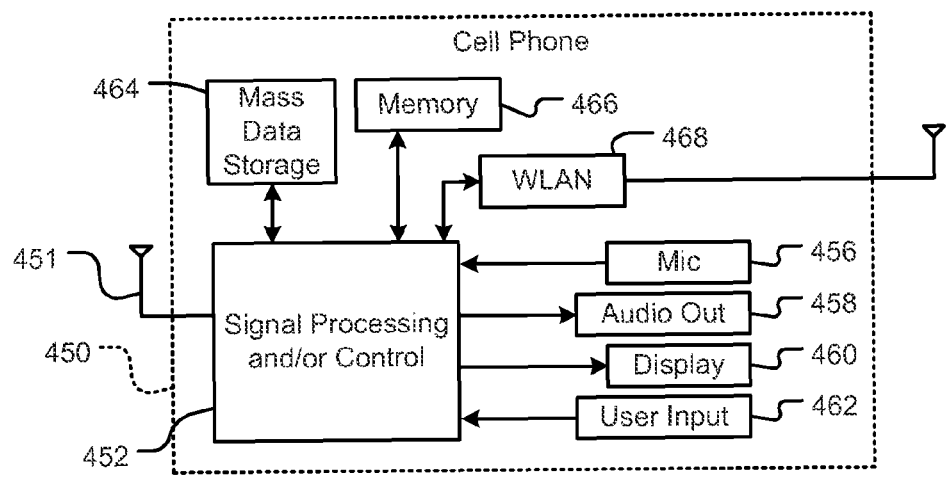
FIG. 6 illustrates an additional embodiment of the invention, embodied in a cellular phone that may include a cellular antenna.

Referring now to FIG. 6, the present invention may be embodied in a cellular phone 450 that may include a cellular antenna 451. The present invention may implement either or both signal processing and/or control circuits, which are generally identified in FIG. 6 at 452, a WLAN interface and/or mass data storage of the cellular phone 450. In some implementations, cellular phone 450 includes a microphone 456, an audio output 458 such as a speaker and/or audio output jack, a display 460 and/or an input device 462 such as a keypad, pointing device, voice actuation and/or other input device. Signal processing and/or control circuits 452 and/or other circuits (not shown) in cellular phone 450 may process data, perform coding and/or encryption, perform calculations, format data and/or perform other cellular phone functions.

Cellular phone 450 may communicate with mass data storage 464 that stores data in a nonvolatile manner such as optical and/or magnetic storage devices for example hard disk drives HDD and/or DVDs. The HDD may be a mini HDD that includes one or more platters having a diameter that is smaller than approximately 1.8". Cellular phone 450 may be connected to memory 466 such as RAM, ROM, low latency nonvolatile memory such as flash memory and/or other suitable electronic data storage. Cellular phone 450 also may support connections with a WLAN via a WLAN network interface 468.

Figure 7:
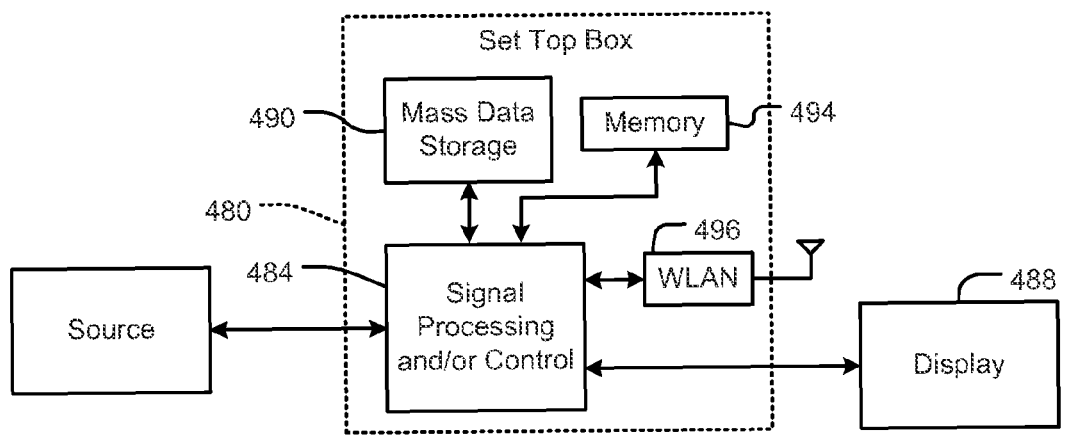
FIG. 7 illustrates an additional embodiment of the invention, embodied in a set top box.

Referring now to FIG. 7, the present invention may be embodied in a set top box 480. The present invention may implement either or both signal processing and/or control circuits, which are generally identified in FIG. 7 at 484, a WLAN interface and/or mass data storage of the set top box 480. Set top box 480 receives signals from a source such as a broadband source and outputs standard and/or high definition audio/video signals suitable for a display 488 such as a television and/or monitor and/or other video and/or audio output devices. Signal processing and/or control circuits 484 and/or other circuits (not shown) of the set top box 480 may process data, perform coding and/or encryption, perform calculations, format data and/or perform any other set top box function.

Set top box 480 may communicate with mass data storage 490 that stores data in a nonvolatile manner. Mass data storage 490 may include optical and/or magnetic storage devices for example hard disk drives HDD and/or DVDs. The HDD may be a mini HDD that includes one or more platters having a diameter that is smaller than approximately 1.8". Set top box 480 may be connected to memory 494 such as RAM, ROM, low latency nonvolatile memory such as flash memory and/or other suitable electronic data storage. Set top box 480 also may support connections with a WLAN via a WLAN network interface 496.

Figure 8:
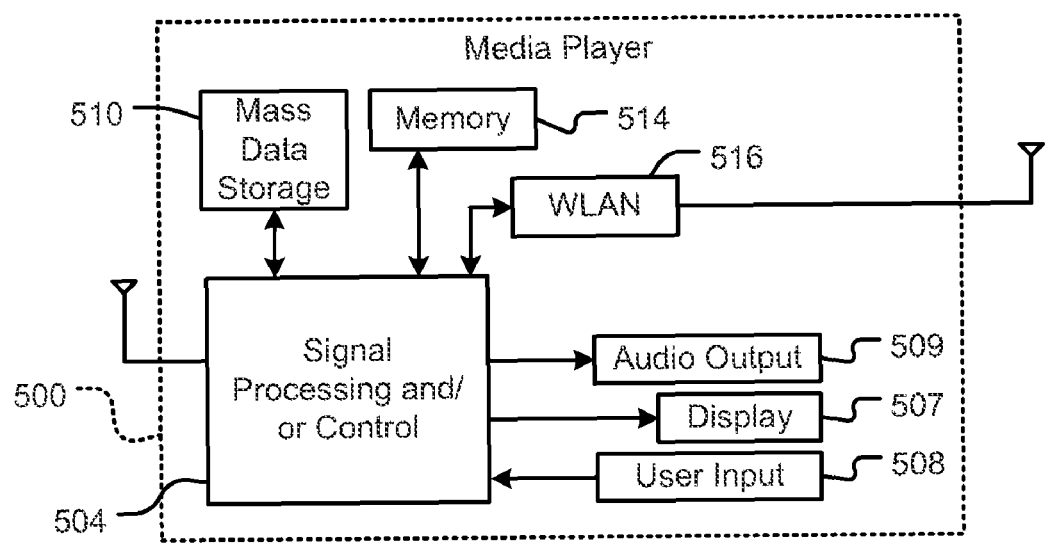
FIG. 8 illustrates an additional embodiment of the invention, embodied in a media player.

Referring now to FIG. 8, the present invention may be embodied in a media player 500. The present invention may implement either or both signal processing and/or control circuits, which are generally identified in FIG. 8 at 504, a WLAN interface and/or mass data storage of the media player 500. In some implementations, media player 500 includes a display 507 and/or a user input 508 such as a keypad, touchpad and the like. In some implementations, media player 500 may employ a graphical user interface (GUI) that typically employs menus, drop down menus, icons and/or a point-and-click interface via display 507 and/or user input 508. Media player 500 further includes an audio output 509 such as a speaker and/or audio output jack. Signal processing and/or control circuits 504 and/or other circuits (not shown) of media player 500 may process data, perform coding and/or encryption, perform calculations, format data and/or perform any other media player function.

Media player 500 may communicate with mass data storage 510 that stores data such as compressed audio and/or video content in a nonvolatile manner. In some implementations, the compressed audio files include files that are compliant with MP3 format or other suitable compressed audio and/or video formats. The mass data storage may include optical and/or magnetic storage devices for example hard disk drives HDD and/or DVDs. The HDD may be a mini HDD that includes one or more platters having a diameter that is smaller than approximately 1.8". Media player 500 may be connected to memory 514 such as RAM, ROM, low latency nonvolatile memory such as flash memory and/or other suitable electronic data storage. Media player 500 also may support connections with a WLAN via a WLAN network interface 516. Still other implementations in addition to those described above are contemplated.

The invention has been described above with respect to particular illustrative embodiments. It is understood that the invention is not limited to the above-described embodiments and that various changes and modifications may be made by those skilled in the relevant art without departing from the spirit and scope of the invention.

What is claimed is:

1. A radio frequency receiver comprising:
a receiving unit configured to receive a radio frequency signal and convert the radio frequency signal to inphase data and quadrature data;
a symbol timing unit configured to
extract phase information of the radio frequency signal based on the inphase data and the quadrature data, and
determine a symbol timing for the radio frequency signal based on the extracted phase information; and
a signal detection and processing unit configured to detect and process transmitted data encoded within the radio frequency signal based on the determined symbol timing.

2. The radio frequency receiver of claim 1, wherein the signal detection and processing unit is further configured to output data based on the detected and processed transmitted data.

3. The radio frequency receiver of claim 1, wherein the symbol timing unit includes a phase extraction unit configured to extract the phase information.

4. The radio frequency receiver of claim 1, wherein the symbol timing is determined based on a selection of one of a plurality of symbol timing candidates, the plurality of symbol timing candidates being determined based on phase differences within the extracted phase information.

5. The radio frequency receiver of claim 1, wherein each of the plurality of symbol timing candidates is calculated substantially as follows:

$$c_n = \sum_{i=n-N+1}^{n} \text{angle}[y(i)y*(i-L)] = \sum_{i=n-N+1}^{n} (a_i - a_{i-L}) = \sum_{i=n-N+1}^{n} d_i$$

wherein $c_n$ represents the symbol timing candidate, $y(n)$ represents the radio frequency signal, $y*(n)$ represents the complex conjugate of $y(n)$, $a_n$ represents a phase of $y(n)$, L represents a symbol duration between two neighboring symbols of the radio frequency signal, N represents a correlation block size associated with the radio frequency signal, and $d_n$ represents the difference between $a_n$ and $a_{n-L}$.

6. A radio frequency receiver comprising:
a receiving unit configured to receive a radio frequency signal and convert the radio frequency signal to inphase data and quadrature data; and
a symbol timing unit configured to
extract phase information of the radio frequency signal based on the inphase data and the quadrature data, and
determine a symbol timing for the radio frequency signal based on the extracted phase information, wherein the symbol timing is determined based on a selection of one of a plurality of symbol timing candidates, the plurality of symbol timing candidates being determined based on phase differences within the extracted phase information.

7. The radio frequency receiver of claim 6, wherein each of the plurality of symbol timing candidates is calculated substantially as follows:

$$c_n = \sum_{i=n-N+1}^{n} \text{angle}[y(i)y*(i-L)] = \sum_{i=n-N+1}^{n} (a_i - a_{i-L}) = \sum_{i=n-N+1}^{n} d_i$$

wherein $c_n$ represents the symbol timing candidate, $y(n)$ represents the radio frequency signal, $y*(n)$ represents the complex conjugate of $y(n)$, $a_n$ represents a phase of $y(n)$, L represents a symbol duration between two neighboring symbols of the radio frequency signal, N represents a correlation block size associated with the radio frequency signal, and $d_n$ represents the difference between $a_n$ and $a_{n-L}$.

8. The radio frequency receiver of claim 6, wherein each of the phase differences correspond to at least a frequency offset of the radio frequency signal, and wherein the determined symbol timing accounts for the frequency offset.

9. The radio frequency receiver of claim 8, wherein each of the plurality of symbol timing candidates is calculated substantially as follows:

$$c_n = \sum_{i=n-N+1}^{n} d_i - N d_{n-N+1}$$

wherein $c_n$ represents the symbol timing candidate, N represents a correlation block size associated with the radio frequency signal, $d_n$ represents the difference in phases between neighboring symbols of the radio frequency signal, and the term $N d_{n-N+1}$ corresponds to the frequency offset.

10. The radio frequency receiver of claim 8, wherein each of the plurality of symbol timing candidates is calculated substantially as follows:

$$c_n = c_{n-1} + (d_n - d_{n-N}) + N(d_{n-N} - d_{n-N+1})$$

wherein $c_n$ represents the symbol timing candidate, N represents a correlation block size associated with the radio frequency signal, and $d_n$ represents the difference in phases between neighboring symbols of the radio frequency signal.

11. The radio frequency receiver of claim 6, wherein each of the plurality of symbol timing candidates is calculated substantially as follows:

$$c_n = \sum_{i=0}^{N-1} \text{angle}[y(n-i)p*(i)] = \sum_{i=0}^{N-1} (a_{n-i} - b_i) = \sum_{i=n-N+1}^{n} d_i$$

wherein $c_n$ represents the symbol timing candidate, y(n) represents the radio frequency signal, $a_n$ represents a phase of y(n), p(n) indicates a pilot value which is known, $b_n$ indicates the phase of p(n), N represents a correlation block size associated with the radio frequency signal, and $d_n$ represents the difference in phases between neighboring symbols of the radio frequency signal.

12. The radio frequency receiver of claim 6, wherein the determined symbol timing is selected from the plurality of symbol timing candidates, $c_n$, using substantially the following formula:

$$\hat{n} = \min_{n}(|C_n|)$$

wherein $\hat{n}$ represents the determined symbol timing.

13. The radio frequency receiver of claim 6, wherein the plurality of symbol timing candidates correspond to symbol timing candidates calculated within the duration of a timer, the timer starting once a symbol timing candidate exceeds a first threshold.

14. The radio frequency receiver of claim 13, wherein the timer stops once a symbol timing candidate falls below a second threshold.

15. The radio frequency receiver of claim 13, wherein the timer stops once a symbol timing candidate falls below a second threshold for a predetermined duration.

16. A method comprising:
receiving a radio frequency signal,
converting the radio frequency signal to inphase data and quadrature data;
extracting phase information of the radio frequency signal based on the inphase data and the quadrature data; and
determining a symbol timing for the radio frequency signal based on the extracted phase information, wherein said determining the symbol timing further comprises
determining a plurality of symbol timing candidates based on phase differences within the extracted phase information, and
selecting one of a plurality of symbol timing candidates as the symbol timing for the radio frequency signal.

17. The method of claim 16, wherein the phase differences correspond to at least a frequency offset of the radio frequency signal, and wherein the determined symbol timing accounts for the frequency offset.

18. The method of claim 16, wherein each of the plurality of symbol timing candidates is calculated substantially as follows:

$$c_n = c_{n-1} + (d_n - d_{n-N}) + N(d_{n-N} - d_{n-N+})$$

wherein $c_n$ represents the symbol timing candidate, N represents a correlation block size associated with the radio frequency signal, and $d_n$ represents the difference in phases between neighboring symbols of the radio frequency signal.

19. The method of claim 16, wherein the plurality of symbol timing candidates correspond to symbol timing candidates calculated within the duration of a timer, the timer starting once a symbol timing candidate exceeds a first threshold.

20. The method of claim 16, wherein the timer stops once a symbol timing candidate falls below a second threshold.

* * * * *